(12) United States Patent
Lee (10) Patent No.: US 6,198,752 B1
(45) Date of Patent: Mar. 6, 2001

(54) ATM VIDEO TELEPHONE TERMINAL INTERWORKING WITH ISDN

(75) Inventor: Hae-Yeong Lee, Kyonggi-do (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/223,397

(22) Filed: Dec. 30, 1998

(30) Foreign Application Priority Data

Dec. 31, 1997 (KR) ................................................. 97-80508

(51) Int. Cl.$^7$ ................................ H04J 3/24; H04J 1/00; H04L 12/28; H04L 12/54
(52) U.S. Cl. ........................ 370/474; 370/395; 370/428; 370/524; 370/238
(58) Field of Search ..................................... 370/235, 234, 370/395, 474, 470, 476, 535, 412, 413, 396, 428, 429, 410, 489, 352, 353, 354, 355, 356, 264, 524, 564, 465–467, 238; 375/222; 348/13–14

(56) References Cited

U.S. PATENT DOCUMENTS

| | | | |
|---|---|---|---|
| 5,136,584 | * | 8/1992 | Hedlund ................................ 370/474 |
| 5,734,653 | * | 3/1998 | Hiraiwa et al. ....................... 370/395 |
| 6,034,954 | * | 3/2000 | Takase et al. ......................... 370/395 |
| 6,088,360 | * | 7/2000 | Amarai et al. ........................ 370/412 |

* cited by examiner

*Primary Examiner*—Ajit Patel
*Assistant Examiner*—Hanh Nguyen
(74) *Attorney, Agent, or Firm*—Sughrue, Mion, Zinn, Macpeak & Seas, PLLC (57) ABSTRACT

An ATM video telephone terminal interworking with ISDN is provided for circuit switching network emulation on AAL-5 for a video telephone service. The ATM video telephone terminal includes a circuit switching network emulation portion. In the circuit switching network emulation portion, ATM transmission and reception cell buffers are connected to a network interface card by a personal computer peripheral component interconnect (PC PCI) bus and connected to a video telephone media portion, for buffering video telephone data transmitted and received between the network interface card and the video telephone media portion. A half fill detector determines whether the ATM reception cell buffer is half filled by received cell. A counter periodically counts reference clock pulses for cell clock generation up to an externally controllable maximum count value. A cell clock generator generates a cell clock signal upon completion of counting the reference clock pulses up to the maximum count value in the counter, provides the cell clock signal to the ATM transmission and reception cell buffers, and controls the maximum count value of the counter depending on the determination of the half fill detector.

4 Claims, 7 Drawing Sheets

ATM VIDEO TELEPHONE TERMINAL INTERWORKING WITH ISDN

BACKGROUND OF THE INVENTION

1. Field of the Invention

The present invention relates to a video telephone terminal connected to an Asynchronous Transfer Mode (ATM) network, and in particular, to a video telephone terminal interworking with an Integrated Services Digital Network (ISDN).

2. Description of the Related Art

Video telephones have been provided according to the H.320 terminal standard as ISDN offered a new telephone service. Over the past few years, video telephone services have been offered on the existing POTS (Plain Old Telephone System) line using a modulator-demodulator (MODEM) and on a local area network (LAN), respectively. The H.324 and H.323 terminal standards are recommended respectively for the video telephone services on the POTS line using a MODEM and on LAN. For interworking of these video telephone services with broadband-ISDN (B-ISDN), the H.321 terminal standard is recommended.

Since the 1980's, many solutions have been proposed to provide video telephone service on ISDN but they have failed to come into wide use. However, the recent development in media processor technology enables implementation of an H.261 video CODEC on a single integrated circuit (IC) chip. Besides, the video CODEC, a G.728 audio CODEC, and a multiplexer/demultiplexer can be integrated on a single chip in some components. Video telephony is effected through an analog MODEM over a telephone network, and can be implemented on a personal computer (PC) simply with software. Microsoft Corporation provides a software called Netmeeting which satisfies the H.323 standard for video teleconference over a LAN. Despite unsatisfactory image quality, which is attributed to the transmission speed limits resulting from the present video telephone service with Point-to-Point Protocol (PPP) through a MODEM over a telephone network, realization of a highly advanced network, that is, an ultra high-speed information communication network will lead to wider provision of telephone service in the future.

When video telephones are widely provided from this perspective, it is expected that a video telephone platform on a circuit switching network such as ISDN coexists with a video telephone platform on LAN. Therefore, an ultra high-speed communication network, such as an ATM network, should accommodate the different service platforms of these two networks, and they should be easily converted or selected by a terminal. A description of the video telephone platforms on the circuit switching network and on LAN follow H.320 and H.323, respectively.

The International Telecommunication Union (ITU) recommends H.321 as an ATM video telephone terminal standard interworking with the video telephone platform on ISDN. H.321 is characterized by additional techniques of emulating a circuit switching network such as ISDN on an ATM network. LAN emulation and Internet Protocol (IP) over ATM have been provided as ways to accommodate the existing LAN network on the ATM network, and a standard for Multi-Protocol Over ATM (MPOA) evolved from them has recently been suggested. Since these techniques are performed under a network layer, an H.323 video telephone platform can easily be realized on the ATM network by modifying a user-to-network interface in a network connecting portion without a new terminal standard. Replacement of a network interface card (NIC) and a device driver provides an environment like the existing LAN.

However, in order to realize H.321, a circuit switching network should be emulated in a user-to-user protocol as well as the user-to-network interface protocol. To prevent data loss on a data buffer in a receiving end or a relay, clock pulses of audio and video sources should be recovered in emulating the circuit switching network for the user data. For this circuit switching network emulation, the ITU recommends an ATM Adaptation Layer (AAL) type 1, that is, AAL-1.

However, difficulties are involved in actual implementation of H.321 because a signalling protocol for a user-to-network interface and almost every service on ATM uses AAL-5, and thus both AAL-5 and AAL-1 should be accommodated. Since simultaneous accommodation of AAL-5 and AAL-1 increases the cost of a terminal in view of system architecture and they require different statistical characteristics and specifications of data, there is no chip solution for accommodating them on a single chip. In AAL-5, a packet data is simply mapped into an ATM cell, whereas in AAL-1, a source clock frequency should be recovered by a phase locked loop (PLL) to map real time bit stream data such as voice and images into an ATM cell.

As described above, because simultaneous accommodation of AAL-5 and AAL-1 results in the increase of terminal cost in view of system architecture, and statistical characteristics and specification requirements of data are different, there is no chip solution to accommodate them on a single chip.

SUMMARY OF THE INVENTION

Therefore, an object of the present invention is to provide an ATM video telephone terminal interworking with ISDN, which enables emulation of a circuit switching network for video telephony on AAL-5.

To achieve the above object, there is provided an ATM video telephone terminal interworking with ISDN, capable of a circuit switching network emulation on AAL-5 for a video telephone service. The ATM video telephone terminal includes a circuit switching network emulation portion. In the circuit switching network emulation portion, ATM transmission and reception cell buffers are connected to a network interface card by a PC Peripheral Component Interconnect (PCI) bus and connected to a video telephone media portion, for buffering video telephone data transmitted and received between the network interface card and the video telephone media portion. A half fill detector determines whether received cell are filled in the ATM reception cell buffer by half. A counter periodically counts reference clock pulses for cell clock generation up to an externally controllable maximum count value. A cell clock generator generates a cell clock signal upon completion of counting the reference clock pulses up to the maximum count value in the counter, provides the cell clock signal to the ATM transmission and reception cell buffers, and controls the maximum count value of the counter depending on the determination of the half fill detector.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE PREFERRED EMBODIMENT

A preferred embodiment of the present invention will be described in detail with reference to the attached drawings. Though details such as communications standards, formats, and procedures are disclosed in the description of the present invention and drawings for comprehensive understanding of the present invention, they are merely exemplary and thus the present invention is not confined to them. A detailed description of known function and structure of the present invention will be omitted when it is deemed to obscure the subject matter of the present invention.

Figure 1:
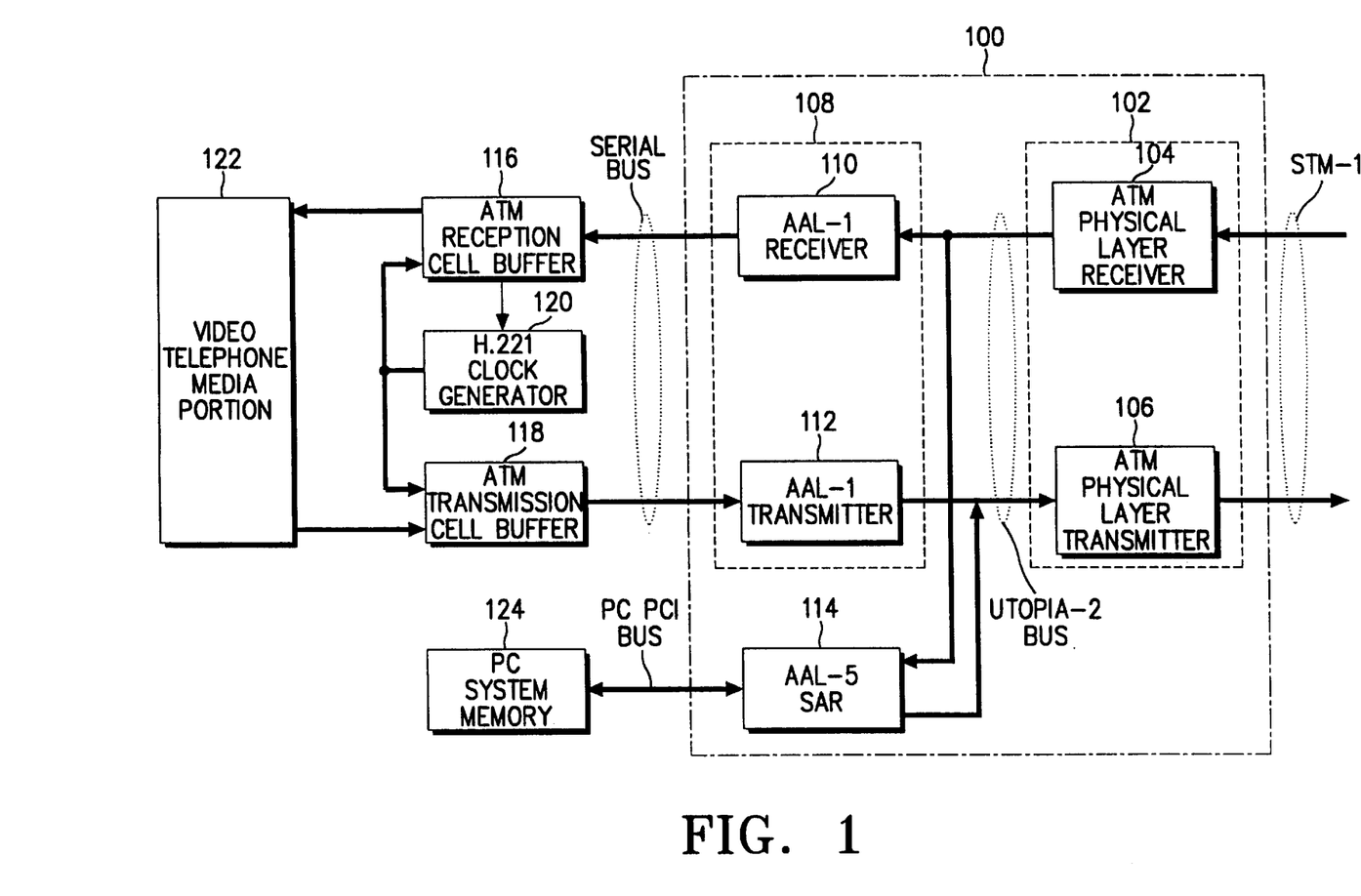
FIG. 1 is a block diagram of a conventional H.321 video telephone terminal employing a circuit switching network emulation using AAL-1.

FIG. 1 is a block diagram of a conventional H.321 video telephone terminal employing a circuit switching network emulation using AAL-1. The H.321 video telephone terminal includes an NIC 100, an ATM reception cell buffer 116, an ATM transmission cell buffer 118, an H.221 clock generator 120, a video telephone media portion 122, and a PC system memory 124. The NIC 100 has an ATM network connecting portion 102, an AAL-1 segment and reassembly sublayer (SAR) 108, and an AAL-5 SAR 114, for providing an interface of network connection. The ATM network connecting portion 102, the AAL-1 SAR 108, and the AAL-5 SAR 114 are provided on respective exclusive purpose chips. The ATM transmission and reception cell buffers 118 and 116 buffer transmitted and received video telephone data by clock pulses generated from the H.221 clock generator 120. The H.221 clock generator 120 has a PLL and generates cell clock pulses. The video telephone media portion 122 performs audio and video CODEC and H.221 multiplexing/demultiplexing for a video telephone, and includes audio and video input/output devices. Here, the ATM network connecting portion 120 is connected to the AAL-1 SAR 108 and the AAL-5 SAR 114 in the NIC 100 by a UTOPIA (Universal Test & Operations PHY Interface for ATM)-2 bus. The AAL-SAR 108 of the NIC 100 is connected to the ATM transmission and reception cell buffers 118 and 116 by a serial bus. The AAL-5 SAR 114 of the NIC 100 is connected to the PC system memory 124 by a PC PCI bus.

An ATM physical layer receiver 104 and an ATM physical layer transmitter 106 in the ATM network connecting portion 102 perform general ATM-related physical media dependent sublayer (PMD) and transmission convergence (TC) functions. That is, they transmit idle cells in the absence of transmission cells, discard idle cells from received cells, separate ATM cells from a series of data streams, and generate ATM cells. The ATM network connecting portion 102 should separate AAL-5 cells and AAL-1 cells from received cells, transmit the data in different paths, and receive ATM cells from the different paths. The AAL-5 SAR 114 serves as a master on the PC PCI bus and can directly access data of the PC system memory 124. Thus, the NIC 100 is driven by an Network Drive Interface Specification (NDIS) driver of a PC (not shown). A video telephone signal is transmitted to the video telephone media portion 122 through an additional path, and thus a chip acting as an AAL-1 SAR is required. This AAL-1 SAR 108 should indicate an H.221 frame start point of a video telephone service in an AAL header. This impedes common use of a terminal supporting H.321. The video telephone media portion 122 should extract clock pulses of a video telephone source by a PLL to prevent overflow or underflow of the ATM transmission and reception cell buffers 118 and 116. Therefore, ATM cells should be read and written from the ATM transmission and reception cell buffers 118 and 116.

As described above, implementation of user-to-network signalling and existing IP-based data communication service, for example, HyperText Transfer Protocol (HTTP) require an AAL-5 SAR chip, an extra serial bus for an AAL-1 data channel in a video telephone service, and means for recovering clock pulses of an audio and video source.

Because the ATM network connecting portion 102 has two paths for AAL-1 and AAL-5 and the AAL-1 SAR 108 is varied depending on applications, it is difficult to obtain a chip suitable for an intended application. For this reason, there is no chip commonly used for a video telephone, thereby increasing the cost of a system. Moreover, no support can be found in the PC. Therefore, the solution is to individually rely on hardware logic without support of an operating system (OS). In addition, the main processor of a PC and video telephone data are not easily accessed, thereby impeding the main processor from exerting its high performance. Thus, it will be a long time before a system satisfying H.321 comes into common use.

In this context, the present invention is intended to provide a video telephone terminal easily interworking with the existent ISDN by implementing a video telephone service using AAL-5.

Figure 2:
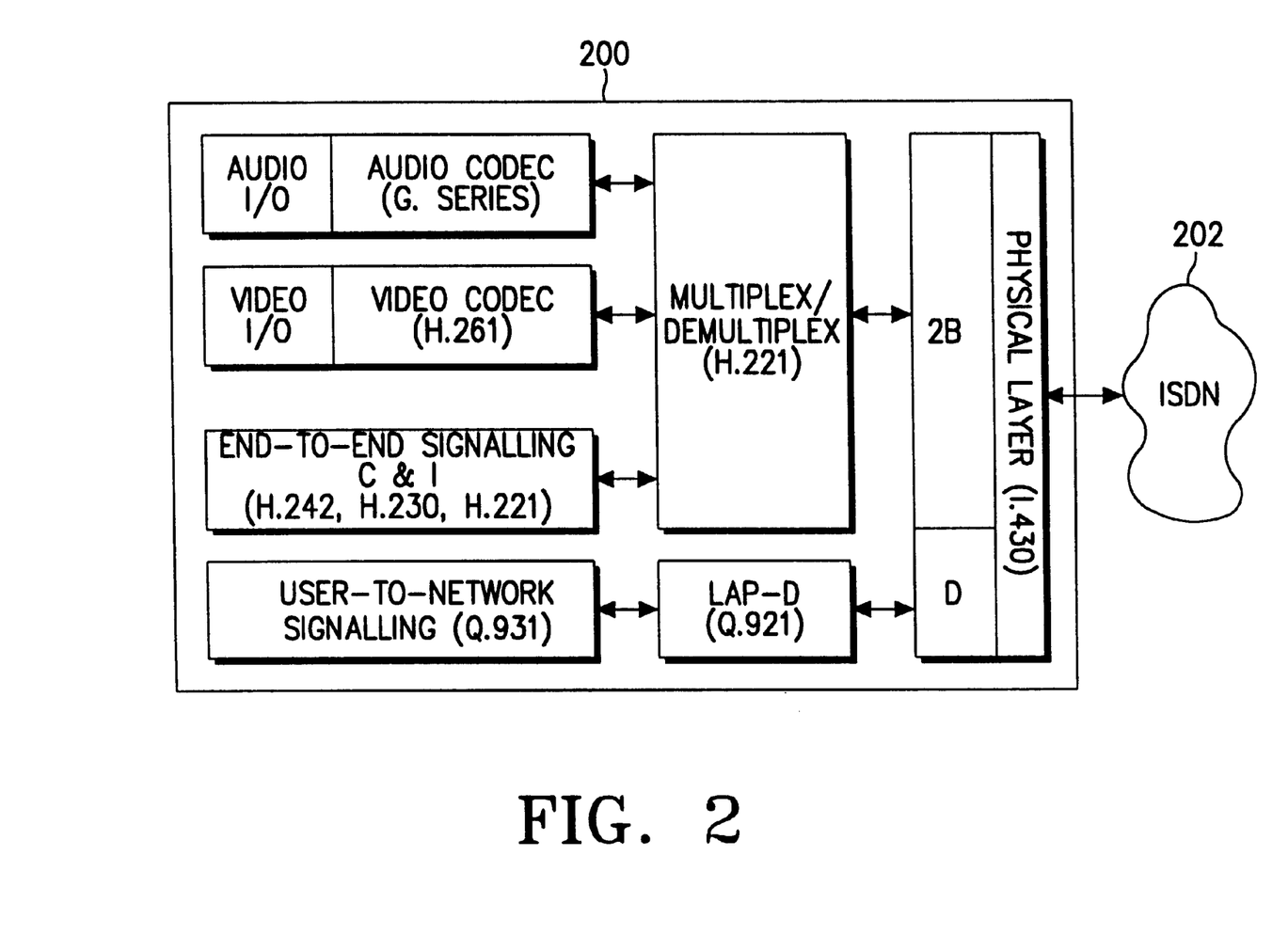
FIG. 2 illustrates the H.320 video telephone communication standard.
Figure 3:
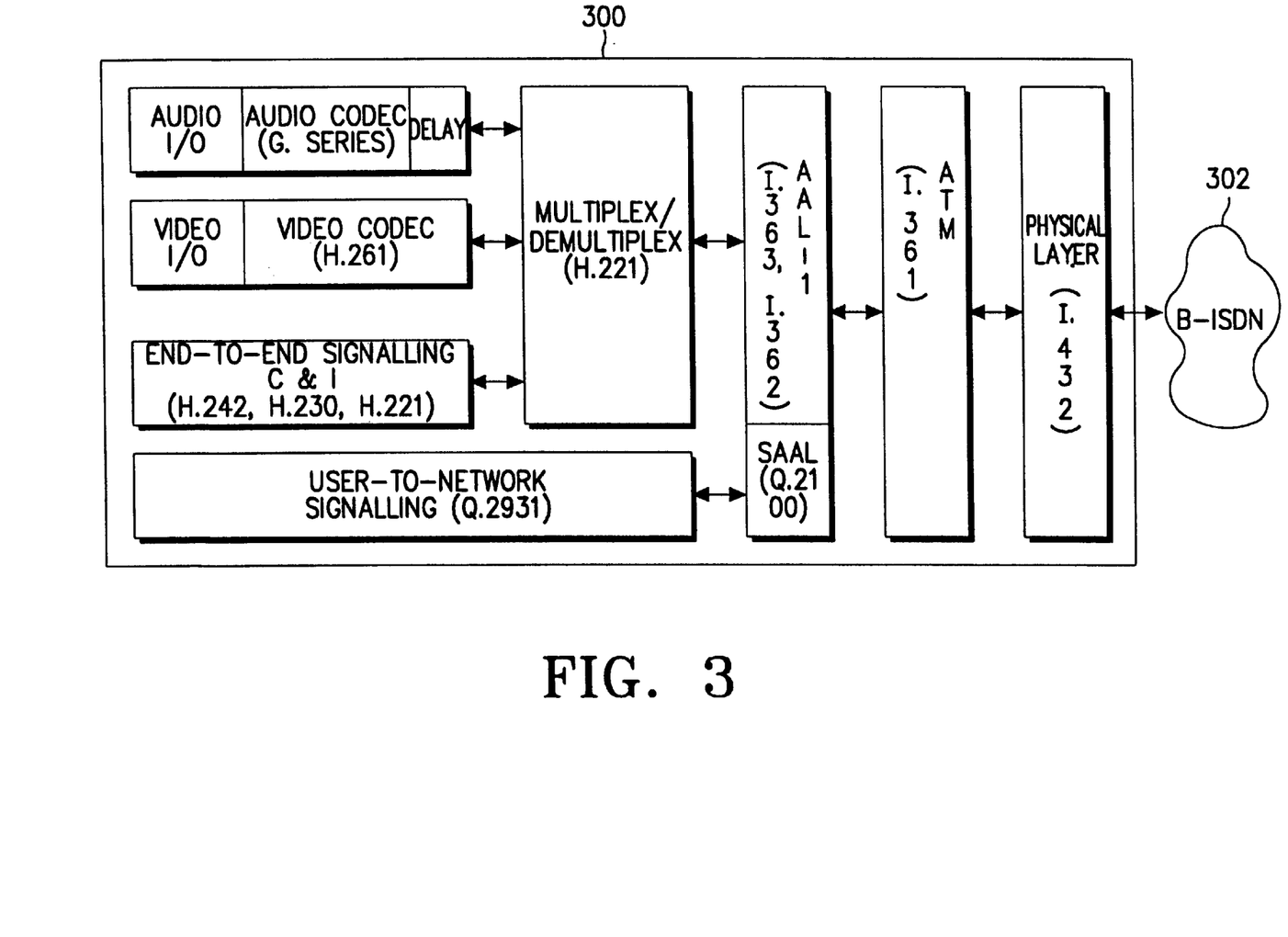
FIG. 3 illustrates the H.321 video telephone communication standard.

For a better understanding of the present invention, the H.320 video telephone standard for ISDN will be compared with the H.321 video telephone standard for ATM, referring to FIGS. 2 and 3. The H.320 and H.321 video telephone communication standards provide protocols shown in FIGS. 2 and 3, respectively. Reference numeral 200 in FIG. 2 denotes protocols for a video telephone terminal and reference numeral 202 denotes ISDN. Reference numeral 300 in FIG. 3 denotes protocols for a video telephone terminal and reference numeral 302 denotes B-ISDN using an ATM network.

From the comparison between FIGS. 2 and 3, it is noted that different standards are applied to network connecting portions on the side of user-to-user protocols for ISDN and ATM. In the case of H.321, additional provisions are given for ATM and AAL layers. A circuit switching network emulation should be performed according to the ATM and AAL-1 layers. Hence, additional circuits are needed to emulate the existing ISDN on the ATM network. On the user-to-network side, the H.320 and H.321 differ from each other in signalling protocol and link layer protocol. Therefore, these user-to-network protocols should be converted in a network connection gateway. From the above comparison of protocols, it is noted that circuit switching network emulation enables communications between a video telephone over ATM and that over ISDN through the network connection gateway.

However, to perform such a circuit switching network emulation, AAL-1 should be implemented for user-to-user protocol, and signalling AAL (SAAL) of AAL-5 should be implemented for user-to-network protocol. These solutions result in circuit complexity and the increase of product cost. Therefore, products following the H.321 protocol have not yet come into the market. To solve this problem, a video telephone terminal for providing a user-to-user protocol on AAL-5 is provided in the present invention.

A description of a telephone service using AAL-5 in an ATM terminal will hereinbelow be given. Before the emergence of the video telephone service on an ATM network, telephone services over public switched telephone network (PSTN) and ISDN, both interworking with the existing ISDN, have already been provided in a circuit switching network, also using AAL-1. A survey of telephone services will be a help to overcome their problems in the present invention.

Figure 4A:
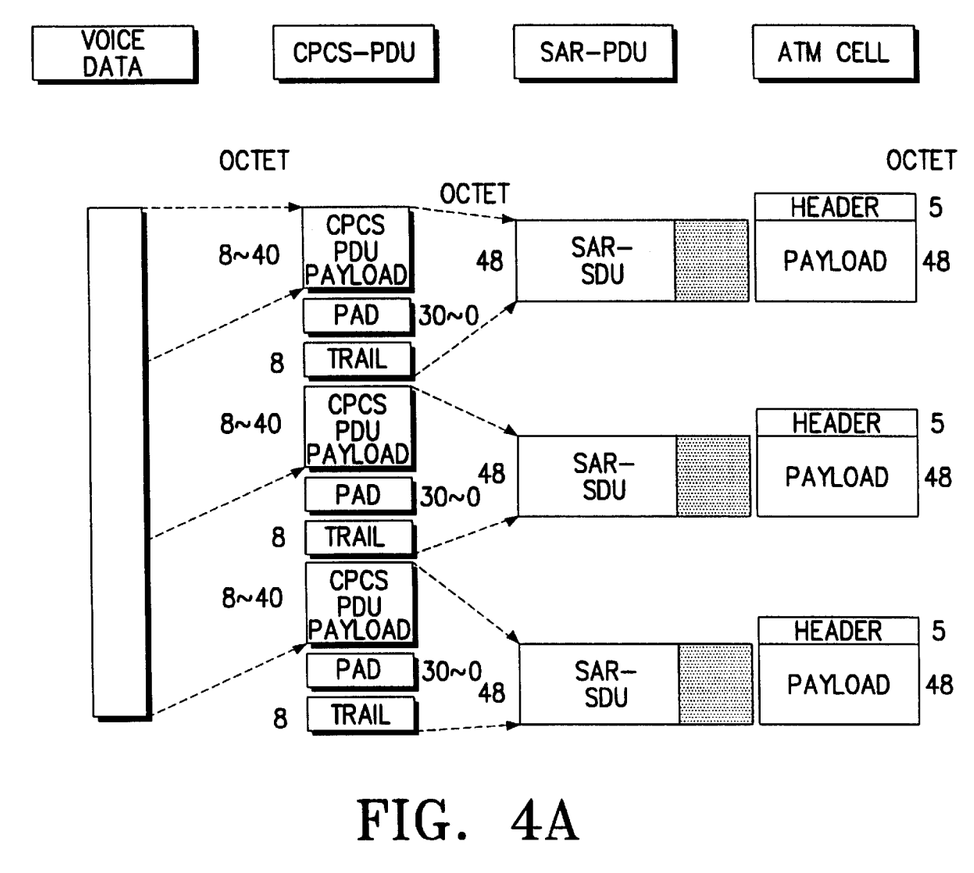
FIGS. 4A and 4B illustrate an ATM mapping method of an audio data signal on AAL-5, recommended by the ATM forum.
Figure 4B:
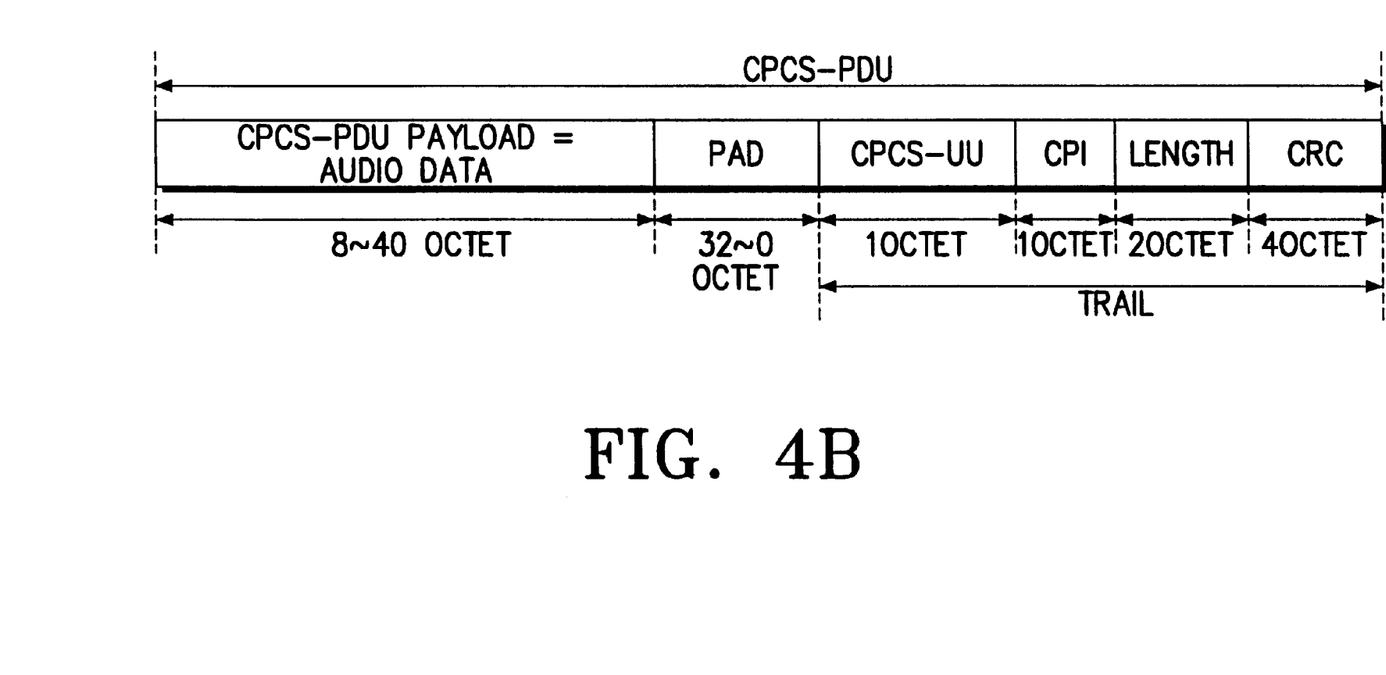

The ATM forum has suggested a method of providing a telephone service on AAL-5 in "af-vtoa-0083.000" published in March, 1997. FIG. 4A illustrates an ATM mapping method of an audio data signal on AAL-5, recommended by the ATM forum, and FIG. 4B illustrates common part convergence sublayer - protocol data unit (CPCS-PDU). According to the article, when an SAR-PDU corresponds to a CPCS-PDU of AAL-5, a CPCS-PDU payload occupies eight octets to forty octets, and an AAL indicator bit of a payload type in an ATM header, always set to "1", indicates the end of the SAR-PDU. CPCS-UU (User to User indication) is set to "00000000". A length field of a CPCS trailer may be encoded to eight to forty octets. With a CPCS-PDU payload of forty octets, the cell rate is 200 cells/second (80000/40). Hence, a cell construction delay is 5 ms, both transmitting and receiving ends experience cell delay, and a slight delay additionally takes place in ISDN and ATM network interworking devices, that is, a gateway device and an ATM switch. As a result, a minimum delay time exceeds 10 ms.

However, the delay time is negligible because a reference value for an average person to perceive voice delay is 100 ms or longer. In addition, since the human ear is insensitive to loss of audio data over a network caused by the difference between clock pulses of the transmitting and receiving ends, there is no need for recovering source clock pulses. In this case, data loss incurs only one byte of error per ten seconds even with the worst crystal error of a clock oscillator, 100 ppm (parts for million). Lest such data loss should influence image quality of facsimile service, it is preferable to explore an additional source clock recovery method.

The aim of the H.321 communication protocol on a user-to-user side is to perform a circuit switching network emulation on an ATM network, accommodating the video telephone protocol over ISDN, H.320, so that protocol complexity is reduce in a network interworking device and thus network interworking is allowed by converting a user-to-network protocol. In the above, however, a method is proposed in which network interworking is performed using AAL-5 required for the user-to-network protocol without AAL-1. Therefore, it is possible to implement an H.321 video telephone using ATM ALL-5, achieving the aim.

Yet, loss of video telephone data should be prevented by recovering source clock pulses due to its sensitiveness to noise. If data is not lost over a network, the source clock information can be detected from the amount of received data. That is, the source clock pulses can be recovered from a reception buffer of an appropriate capacity.

Figure 5:
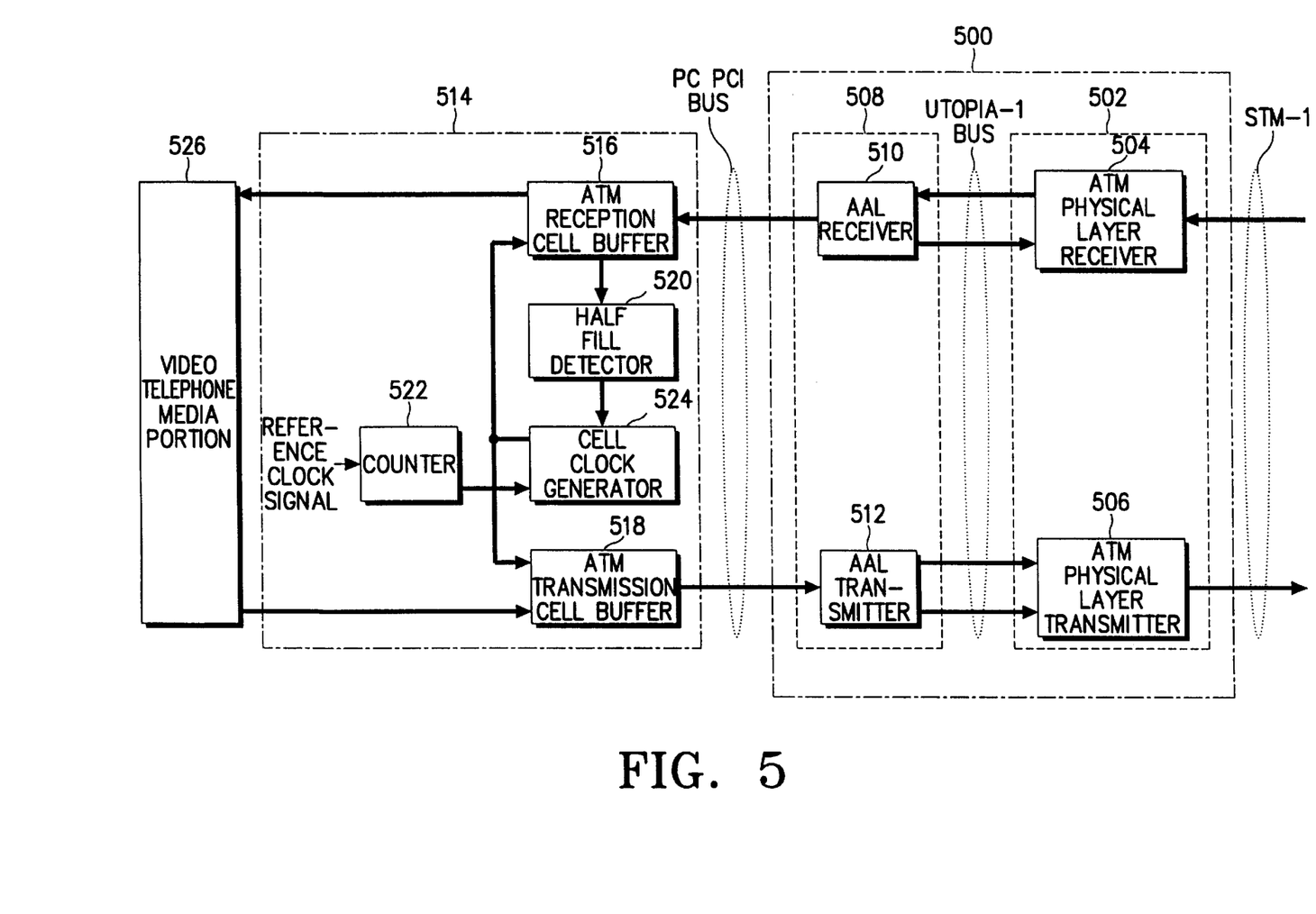
FIG. 5 is a block diagram of an H.321 video telephone terminal employing a circuit switching network emulation using AAL-5 according to an embodiment of the present invention.

FIG. 5 is a block diagram of an H.321 video telephone terminal employing a circuit switching network emulation using AAL-5, with an ATM terminal providing a telephone service using AAL-5, according to an embodiment of the present invention. The video telephone terminal of FIG. 5 includes an NIC 500, a circuit switching network emulation portion 514, and a video telephone media portion 526. The NIC 500 for providing an interface of network connection by STM-1 has an ATM physical layer connecting portion 502 and an ATM SAR 508. An ATM physical layer receiver 504 and an ATM physical layer transmitter 506 of the ATM network connecting portion 502 perform general ATM-related PMD and TC functions like the ATM network connecting portion 102 of FIG. 1. The ATM SAR 508 includes AAL transmitter and receiver 512 and 510 for performing an SAR function of an ATM AAL-5 layer. Here, a UTOPIA-1 bus connects the ATM network connecting portion 502 to the ATM SAR 508. The video telephone media portion 526 performs audio and video CODEC and H.221 multiplexing/demultiplexing for a video telephone service and includes audio and video input/output devices, like the video telephone media portion 526 of FIG. 1.

The circuit switching network emulation portion 514 performs a circuit switching network emulation on an ATM network, accommodating H.320 for ISDN, and includes ATM transmission and reception cell buffers 518 and 516, a half fill detector 520, a counter 522, and a cell clock generator 524. The ATM transmission and reception cell buffers 518 and 516 are connected to the NIC 500 by a PC PCI bus, and connected to the video telephone media portion 526, for buffering video telephone data transmitted and received between the NIC 500 and the video telephone media portion 526 by cell clock pulses. The half fill detector 520 determines whether received cells are filled in the ATM reception cell buffer 516 by half. This half fill detector 520 is a general half fill detector. The counter 522 periodically counts values up to a predetermined maximum count value, which is externally controllable. The counter 522 periodically counts reference clock pulses for cell clock generation up to the externally controllable maximum count value. The cell clock generator 524 generates cell clock pulses upon completion of counting values up to the maximum count value in the counter 522, provides the cell clock pulses to the ATM transmission and reception cell buffers 518 and 516, and controls the maximum count value according to the determination of the half fill detector 529 whether the received cells are filled in the ATM reception cell buffer 516 by half.

Relying on the fact that source clock information can be found from the amount of received data in the absence of data loss over a network and a source clock signal can be recovered using a reception buffer of an appropriate capacity, in the circuit switching network emulation portion 514, the reference clock signal of the counter 522 has a frequency obtained by multiplying the transfer rate of a 64 KHz fundamental channel of an audio signal by the number N of H.221 multiplexing channels. In this case, assuming that a CPCS-PDU payload is 40 octets, an initial maximum count value of the counter 522 is set to 320 (40×8). Then, the cell clock generator 524 generates cell clock pulses when the counted value of the counter is 3320, and controls the maximum count value of the counter 522 depending on the determination of the half fill detector 520.

Figure 6:
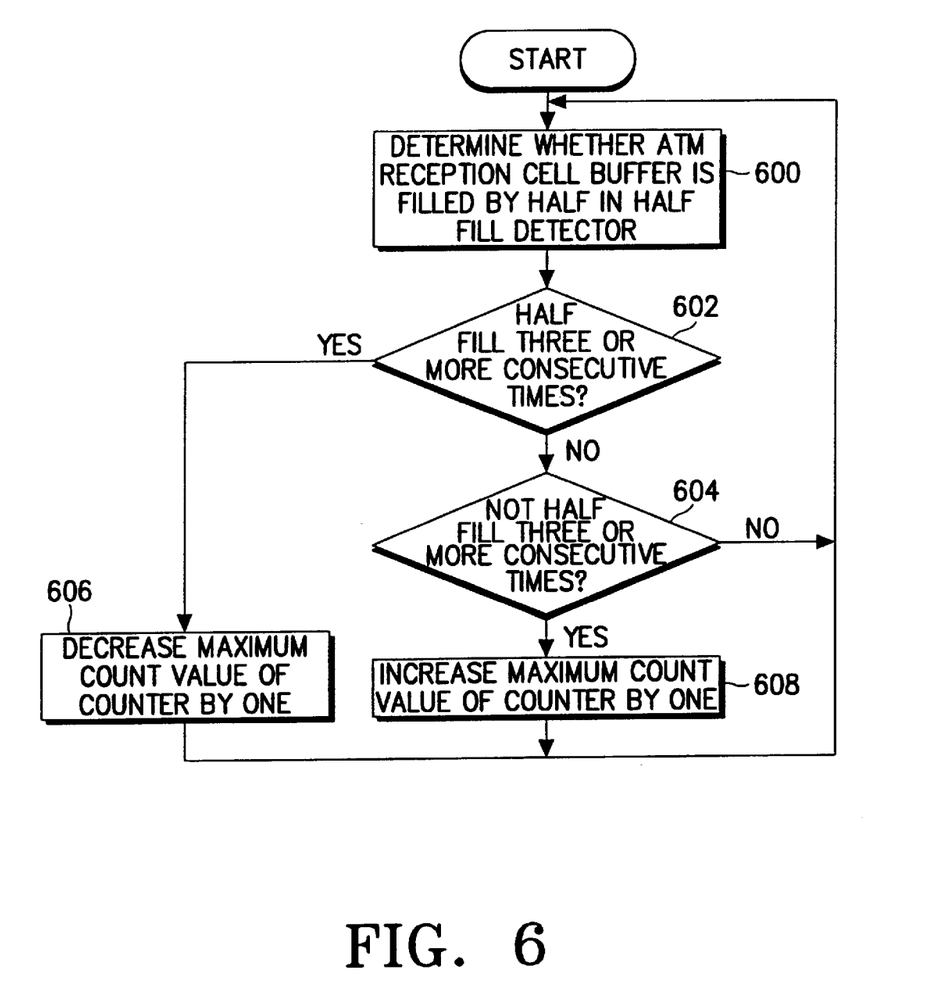
FIG. 6 is a flowchart showing the operation of a cell clock generator shown in FIG. 5 according to the embodiment of the present invention.

FIG. 6 is a flowchart for controlling the counter 522 by the cell clock generator 524. When the counter 522 finishes counting values up to the maximum count value, the half fill detector 520 determines whether the ATM reception cell buffer 516 is filled by half, in step 600. In steps 602 and 604, it is determined whether the ATM reception cell buffer 516 is filled by half three consecutive times or not. If the determination is three consecutive half fills, the cell clock generator 524 decreases the maximum count value of the counter 522 by one, in step 606. For example, if the maximum count value is 320, it is reduced to 319. In this case, the cell clock generator 524 generates cell clock pulses every time the counter 522 counts values to 319. On the other hand, if the determination is not three consecutive half fills in step 602, the maximum count value of the counter 522 is increased by one. For example, if the maximum count value is 320, it is increased to 321. In this case, the cell clock generator 524 generates cell clock pulses every time the counter 522 counts values to 321. If the determination is not either of the above both cases, the maximum count value is not controlled.

Thus, a source clock signal can be recovered. That is, the error exceeds the error of a crystal oscillator, 100 ppm in consideration of the worst case, and thus natural digital PLL effects can be achieved.

At a constant bit rate (CBR), three cells are sufficient for a traffic delay buffer on an ATM network. Thus, four cells, that is 20 ms needs to be delayed: one cell for a transmitting end and three cells for a receiving end. Generally, a decoder buffer is used for video CODEC and voice is also delayed by 20 ms in consideration of lip synchronization of image and voice. A total delay time over the entire system will be increased and the system can be constructed to have a total delay time of about 60 ms in view of a delay in a network gateway, and so on.

An ATM mapping method of a video telephone data signal on AAL-5 may be implemented in the same manner as that of an audio data signal, only if audio data is replaced with a signal multiplexed from audio and video signals following H.221 and the number of video telephone channels is determined according to H.242 user-to-user signalling. Thus, determination of the transfer bit rate of a channel should involve a user-to-user protocol and a user-to-network protocol. Using such information, the maximum count value of the counter 522 is determined.

As B-ISDN is widely used and a transmission speed over a network increases, many services will be implemented in a PC terminal. Among them, a video telephone service will attract much attention due to the advantage of its interactive service as in a face-to-face talk. So far video telephone services have been provided through different platforms on ISDN and LAN, and an ATM video telephone terminal needs to simultaneously implement different platforms and provide a corresponding platform according to a network. ATM ALL layers will follow AAL-5 uniformly. In the present invention, a video telephone terminal following the direction of H.321 can be achieved under the actual constraints, and a real time service quality level required for a video telephone service can be satisfied.

As described above, the present invention provides an ATM video telephone terminal interworking with ISDN, capable of a circuit switching network emulation on AAL-5 for a video telephone service.

While the present invention has been described in detail with reference to the specific embodiment, many variations can be made by anyone skilled in the art within the scope and spirit of the present invention. Especially, the frequency of the reference clock signal, the maximum count value of the counter 522, and the criterion of controlling the maximum count value in the present invention may be varied in accordance with applications of the present invention.

What is claimed is:

1. An Asynchronous Transfer Mode (ATM) video telephone terminal interworking with Integrated Services Digital Network (ISDN), comprising:
   a network interface card comprising an ATM physical connecting portion for performing ATM-related physical media dependent sublayer (PMD) and transmission convergence (TC) functions and an ATM segment and reassembly sublayer (SAR) for performing a SAR function of an ATM AAL-5 layer, to provide a network connection interface;
   a video telephone media portion comprising audio and video input/output devices, for performing audio and video coding/decoding (CODEC) and H.221 multiplexing/demultiplexing for video telephone service;
   a circuit switching network emulation portion for performing a circuit switching network emulation while accommodating a H.320 terminal standard for ISDN, said circuit switching network emulation portion comprising:
      ATM transmission and reception cell buffers, connected to the network interface card by a personal computer peripheral component interconnect (PC PCI) bus and connected to the video telephone media portion, for buffering video telephone data transmitted and received between the network interface card and the video telephone media portion;
      a half fill detector for determining whether the ATM reception cell buffer is half filled by received cells;
      a counter for periodically counting reference clock pulses for cell clock generation up to an externally controllable maximum count value; and
      a cell clock generator for generating a cell clock signal upon completion of counting the reference clock pulses up to the maximum count value in the counter, providing the cell clock signal to the ATM transmission and reception cell buffers, and controlling the maximum count value of the counter in accordance with the determination of the half fill detector.

2. The ATM video telephone terminal of claim 1, wherein the reference clock signal has a frequency obtained by multiplying a transfer rate of a fundamental channel in an audio signal by the number of H.221 multiplexing channels.

3. The ATM video telephone terminal of claim 2, wherein the cell clock generator decreases the maximum count value by one when the half fill detector determines that the ATM reception cell buffer is filled by half for at least a predetermined numbered times, and increases the maximum count value by one when the half fill detector determines that the ATM reception cell buffer is not filled by half for at least a predetermined numbered times.

4. The ATM video telephone terminal of claim 3, wherein the predetermined numbered times is three times.

* * * * *